United States Patent [19]

Ram et al.

[11] Patent Number: 5,215,192
[45] Date of Patent: Jun. 1, 1993

[54] METHOD FOR IMPROVING THE ARCHIVAL PROPERTIES OF PROCESSED PHOTOGRAPHIC FILM IN A STORAGE ASSEMBLY FOR ACHIEVING THE SAME

[75] Inventors: Arunachalam T. Ram, Rochester; Carl F. Holtz, Fairport; Richard C. Sehlin; David F. Kopperl, both of Rochester, all of N.Y.

[73] Assignee: Eastman Kodak Company, Rochester, N.Y.

[21] Appl. No.: 961,964

[22] Filed: Oct. 16, 1992

[51] Int. Cl.[5] ............... B65D 81/24; B65D 85/671
[52] U.S. Cl. ............................. 206/205; 53/402; 53/428; 206/389; 206/403
[58] Field of Search ............... 53/400–402, 53/428; 206/204, 205, 316.1, 389, 397, 403–408

[56] References Cited

U.S. PATENT DOCUMENTS

| | | | |
|---|---|---|---|
| 1,019,589 | 3/1912 | Beadell | 206/205 |
| 1,042,801 | 10/1912 | Kitsee | 206/205 |
| 1,121,919 | 12/1914 | Griffey et al. | 206/205 |
| 1,231,945 | 7/1917 | Rupert | 206/205 |
| 1,726,573 | 9/1929 | Lang | 206/205 |
| 1,918,109 | 7/1933 | Joyce | 206/403 |
| 2,278,295 | 3/1942 | Wilson | 206/205 |
| 5,048,262 | 9/1991 | Kakuda | 53/401 |

Primary Examiner—Jimmy G. Foster
Attorney, Agent, or Firm—Robert A. Gerlach

[57] ABSTRACT

A method for improving the archival properties of a processed photographic film and a storage assembly for achieving the same by placing the film in a sealed container together with molecular sieve zeolites.

19 Claims, 1 Drawing Sheet

METHOD FOR IMPROVING THE ARCHIVAL PROPERTIES OF PROCESSED PHOTOGRAPHIC FILM IN A STORAGE ASSEMBLY FOR ACHIEVING THE SAME

BACKGROUND OF THE INVENTION

Field of the Invention

This invention relates to a method of improving the archival properties of a processed photographic film and to a storage assembly for such film.

The archival properties of processed photographic films are an important aspect for all types of photographic films, and are even more important with respect to motion picture photographic films. The archival keeping properties of photographic films are expected to be measured by decades and even in certain instances by centuries. Such time periods of course cannot be determined by natural measurements but are accurately predicted by Arrhenius estimations.

It has been a common practice to use hermetically sealed containers including tin-plated or painted metal (iron) cans, plastic cans, cardboard boxes and the like to store processed motion picture films to extend their useful life under controlled humidities and temperatures. Storage of films in metal cans offers the best moisture protection and generally prevents attack on image silver and image dyes by vapor phase chemical contamination from atmospheric pollutants. The ANSI (American National Standard for Imaging Media) IT9. 11-1992 standard on storage of processed photographic films requires that the relative humidity be maintained between 20 and 30% RH and that the maximum temperature of storage shall not exceed 21° C. for black and white films, while the storage of color films shall not exceed 2° C. It is imperative that both the relative humidity and the temperature during storage are maintained to insure the expected longevity of the imaging media and for the subsequent retrieval, projection and duplication of the recorded information. Because of the complex nature of photographic films, the various mechanisms for attack on the film that reduce the archival properties of the film are both numerous and complex. Open storage under atmospheric conditions, while suitable to prevent degradation from some forms of attack, is not only impractical, but also results in attack from atmospheric contaminants such as hydrogen peroxide, sulfur dioxide, ozone, moist oxygen, nitrogen oxides, and other species which attack the image silver in black and white films. The image dyes are susceptible to fading when exposed to high intensity light or elevated temperatures and humidities and hence require fairly low temperatures and humidity during storage. Dye fading reactions under confined storage conditions result from various and numerous mechanisms including film support degradations, which have become known as the "vinegar syndrome" resulting in the liberation of acids which decrease the life of the film. The presence of moisture also creates archival disadvantages since the presence of moisture acts as a protoic catalyst that increases the rate of deacetylation and the step wise elimination of acetic acid from cellulose triacetate supports. Thus, the presence of moisture accelerates the vinegar syndrome effect which in turn decreases the pH within the environment of the stored film and this in turn results in the dye fading of the photographic element being stored.

In addition to the presence of the materials mentioned above, in closed containers wherein photographic elements are stored for archival purposes, the presence of solvents employed in the manufacture of the photographic film also creates problems in that these materials can disadvantageously affect the photographic properties of the film.

Thus, the archival properties of a processed photographic film stored within the closed container are inherently dependent upon the environment within the container and the changes that are continually occurring with respect to the various layers present in the processed film. These various changes working either alone or together result in alterations to the film which are undesirable and require correction.

SUMMARY OF THE INVENTION

The problems encountered in the storage of photographic elements with respect to the archival properties expressed above, are solved in accordance with this invention by providing a storage assembly for processed photographic elements and a method of improving the archival properties by placing the processed photographic element into a container substantially immediately after processing and disposing within the container at least 3 percent by weight, preferably from about 5 to about 20 percent by weight based on the weight of the photographic element of a molecular sieve zeolite and sealing the container.

The advantages obtained by practicing the process of this invention utilizing the storage assembly of this invention is the increase in archival properties of the processed photographic film. While applicants do not wish to bound by any particular theory with respect to the mechanism by which the increased lifetime is brought about, it is believed that the presence of the molecular sieve scavenges the acids, moisture and solvents generated internally by the films during storage and oxidants, such as, hydrogen peroxide, sulfur dioxide, ozone, nitrogen oxides and the like from ambient surroundings before the film is placed in the sealed container. It is believed that acid-catalyzed hydrolytic degradation of the film support and the resulting loss of dye stability is enhanced by prevention of moisture accumulation. Without moisture, acid formation from hydrolysis of the film support material is prevented, thus decreasing acid interactions with the dyes present in the processed photographic element. It is believed that residual solvents given up by the film during storage together with other atmospheric contaminants are sequestered by the molecular sieve, thus stabilizing the imaged silver, image dyes and optical sound recordings, such as those present on motion picture films, from further oxidation or deterioration. Another advantage of the invention is that it prevents mold growth.

DETAILED DESCRIPTION OF THE INVENTION

Figure 1:
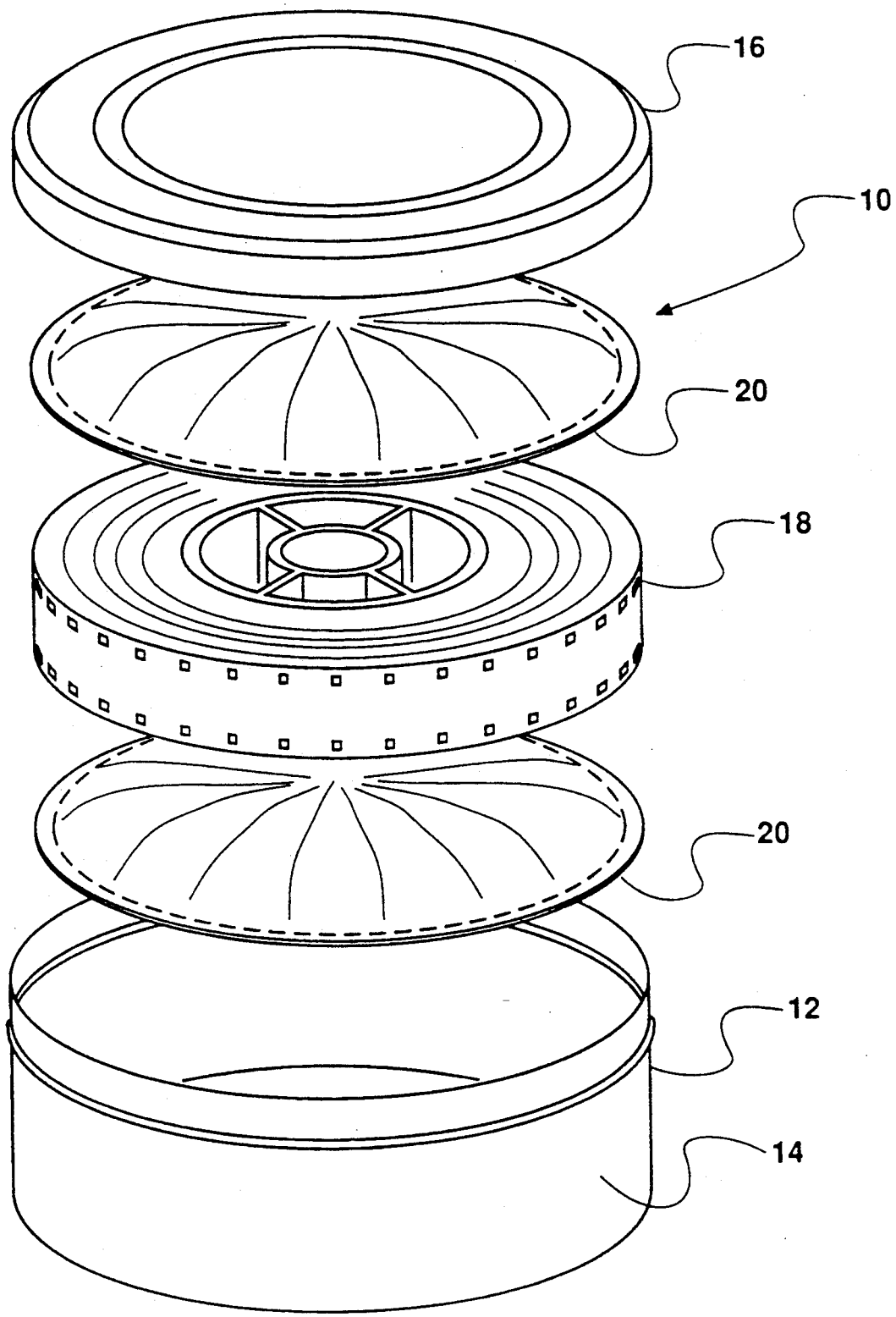
FIG. 1 is an exploded schematic illustration of a storage assembly for a processed photographic element in accordance with this invention.

FIG. 1 illustrates a preferred embodiment of a storage assembly for photographic elements in accordance with this invention. While the drawing illustrates the storage of a reel of processed motion picture film, it should be understood that while this is the preferred embodiment other suitable types of photographic elements can be stored in similar manner utilizing containers that approximate the size and configuration of the photographic element. In the FIGURE, the storage assembly 10 includes a container 12 having a base portion 14 and a lid portion 16. Container 12 may be fabricated from any suitable material including cardboard, stainless steel, plastic materials, glass, tin plated iron, painted iron or the like. In addition, the container may be in the form of an envelope prepared from various types of laminated materials as illustrated in U.S. Pat. Nos. 4,784,906; 4,780,357; 4,551,367 and other comparable materials. Regardless of the configuration of the container 12, it should form a sealed cavity preferably an hermetically sealed container once it is closed. In FIG. 1, for example, when lid 16 is positioned in place on base 14, the container is sealed. Of course, it should be understood that various types of sealing materials such as, tape and the like may be employed to bring about the hermetic sealing of the container. When flexible bags are employed as the storage container, heat sealing is an advantageous way of hermetically sealing.

The two packets 20 positioned on either side of the photographic motion picture reel 18 contain a quantity of molecular sieve zeolite such that the total weight present in the two packets is at least 3 percent by weight of the total weight of the photographic element 18. Preferably, the weight of the molecular sieve zeolite present in the two packets is from about 5 to about 20 percent by weight based on the weight of the photographic element in order to achieve the best possible archival properties. It should be understood that only one packet or envelope 20 containing a molecular sieve zeolite is necessary so long as the minimum weight of the zeolite based on the weight of the film is exceeded. For best results, however, multiple envelopes 20 are employed in order that the molecular sieve zeolites can be preferentially positioned relative to the photographic element. In a preferred embodiment of this invention, the internal volume of the container 12 should not exceed two times the volume occupied by the photographic element. Thus, in FIG. 1, if the volume of film reel 18 is 5671 cm$^3$ (Diameter 38 cm, width 5 cm) the volume of the container should not exceed 11342 cm$^2$. For best results, the volume of the container should not exceed 1.5 times the volume occupied by the photographic element. These relative dimensions will provide ample space for the quantity of molecular sieve zeolite as indicated above.

In the process in accordance with this invention, the processed photographic element, i.e., in the embodiment shown, a reel of processed photographic motion picture film 18 is positioned within the base 14 of container 12 substantially immediately following processing of the film. The invention is applicable to all types of photographic elements including both black and white and color photographic elements. The invention is particularly applicable to color motion picture films including color negative films and positives produced therefrom. It is especially applicable to color negative films as these require extremely long archival stability as they are utilized in preparation of the positive motion picture film for projection in theaters. The invention is also applicable regardless of the type of film support upon which the photosensitive layers are built. Suitable supports include, for example, cellulose nitrate, cellulose triacetate, polyethylene terephthalate, polycarbonate, polyester ionomers such as those disclosed in U.S. Pat. 5,138,024 filed Jan. 25, 1991, which is commonly assigned to the same assignee as the immediate application, and the like. The fact of poor archival properties is generally evidenced by dye fading of the developed dyes present in the processed photographic element. While all dyes are not as susceptible to fading as others, it has been determined that this invention is applicable for increasing the archival properties of substantially all commercially available photographic elements regardless of manufacture.

In the practice of the process of this invention, a packet or envelope 20 containing a suitable quantity of molecular sieve zeolite material is first deposited into the base portion 14 of container 12. It should be understood that a number of envelopes can be substituted for each of the envelopes 20 shown in FIG. 1. When such is the case, the total of molecular sieve should be within the ranges set forth above. The packet or envelope 20 is formed of a material that is permeable to air but impermeable to the passage of the molecular sieve zeolite. While the molecular sieve zeolite may be loosely deposited within the container, it is preferred that it be constrained within an envelope such as shown in the FIGURE in order to prevent physical damage to the photographic element by being in direct contact with face portions of the element. A suitable envelope material is one made of spun bonded polyethylene or polypropylene such as a material bearing the trade designation Tyvek sold by the DuPont Company. Nylon mesh envelopes or packets wherein the mesh has openings smaller than the particle size of the molecular sieve are also suitable for containing the molecular sieve zeolite particles. As shown in FIG. 1, the dimensions of the envelope are coextensive with the measurable outer diameter of the processed motion picture film in reel form. This is preferred as it enables the positioning of the molecular sieve as close as possible to the area where any of the materials being expelled by the film are present, since the major portion of any gaseous ingredients used in the preparation of the film will come out between the layers of the rolled up film. This is a preferred position for the molecular sieve zeolite material.

Any suitable molecular sieve zeolite such as, for example, Type A, Type L, Type X, Type Y and mixtures of these zeolites may be used in this invention. The molecular sieve materials are crystalline, hydrated metal allumino-silicates which are either made synthetically or naturally occurring minerals. Such materials are described in U.S. Pat. Nos. 2,882,243, 2882,244, 3,078,636, 3,140,235 and 4,094,652, all of which are incorporated herein by reference. In the practice of this invention the two types, A and X are preferred. Molecular sieve, zeolites contain in each crystal interconnecting cavities of uniform size, separated by narrower openings, or pores, of equal uniformity. When formed, this crystalline network is full of water, but with moderate heating, the moisture can be driven from the cavities without changing the crystalline structure. This leaves the cavities with their combined surface area and pore volume available for absorption of water or other materials. The process of evacuation and refilling the cavities may be repeated indefinitely, under favorable conditions.

With molecular sieves close process control is possible because the pores of the crystalline network are uniform rather than of varied dimensions, as is the case with other adsorbents. With the large surface area and pore volume, molecular sieves can make separations of molecules, utilizing pore uniformity, to differentiate on the basis of molecular size and configuration.

Molecular sieves are crystalline, metal aluminosilicates with three dimensional network structures of silica and alumina tetrahedra. This very uniform crystalline structure imparts to the molecular sieves properties which make them excellent desiccants, with a high capacity even at elevated temperatures. The tetrahedra are formed by four oxygen atoms surrounding a silicon or aluminum atom. Each oxygen has two negative charges and each silicon has four positive charges. This structure permits a sharing arrangement, building tetrahedra uniformly in four directions. The trivalency of aluminum causes the alumina tetrahedron to be negatively charged, requiring an additional cation to balance the system. Thus, the final structure has sodium, potassium, calcium or other cations in the network. These charge balancing cations are the exchangeable ions of the zeolite structure.

In the crystalline structure, up to half of the quadrivalent silicon atoms can be replaced by trivalent aluminum atoms. Zeolites containing different ratios of silicon to aluminum ions are available, as well as different crystal structures containing various cations.

In the most common commercial zeolite, Type A, the tetrahedra are grouped to form a truncated octahedron with a silica or alumina tetrahedron at each point. This structure is known as sodalite cage.

When sodalite cages are stacked in simple cubic forms the result is a network of cavities approximately 11.5 Å in size, accessible through openings on all six sides. These openings are surrounded by eight oxygen ions. One or more exchangeable cations also partially block the face area. In the sodium form, this ring of oxygen ions provides an opening of 4.2 Å in diameter into the interior of the structure. This crystalline structure is represented chemically by the following formula:

$$Na_{12}[Al(O_2)_{12}] \times H_2O$$

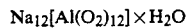

The water of hydration which fills the cavities during crystallization is loosely bound and can be removed by moderate heating. The voids formerly occupied by this water can be refilled by adsorbing a variety of gases and liquids. The number of water molecules in the structure (the value of X) can be as great as 27.

The sodium ions which are associated with the aluminum tetrahedra, tend to block the openings, or conversely may assist the passage of slightly oversized molecules by their electrical charge. As a result, this sodium form of the molecular sieve, which is commercially called 4 A, can be regarded as having uniform openings of approximately 4 Å diameter.

Because of their base exchange properties, zeolites can be readily produced with other metals substituting for a portion of the sodium.

Among the synthetic zeolites, two modifications have been found particularly useful in industry. By replacing a large fraction of the sodium with potassium ions, the 3 A molecular sieve is formed (with openings of about 3 Å). Similarly, when calcium ions are used for exchange, the 5 A (with approximately 5 Å openings) is formed.

The crystal structure of the Type X zeolite is built up by arranging the basic sodalite cages in a tetrahedral stacking (diamond structure) with bridging across the six-membered oxygen atom ring. These rings provide opening 9-10 Å in diameter into the interior of the structure. The overall electrical charge is balanced by positively charged cation(s), as in the Type A structure. The chemical formula that represents the unit cell of Type X molecular sieve in the soda form is shown below:

$$Na_{86}[(AlO_2)_{86}(SiO_2)_{106}] \times H_2O$$

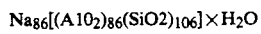

As in the case of the Type A crystals, water of hydration can be removed by moderate heating and the voids thus created can be refilled with other liquids or gases. The value of X can be as great as 276.

A prime requisite for any adsorbent is the possession of a large surface area per unit volume. In addition, the surface must be chemically inert and available to the required adsorbate(s). From a purely theoretical point of view, the rate at which molecules may be adsorbed, other factors being equal, will depend on the rate at which they contact the surface of adsorbent particles and the speed with which they diffuse into particles after contact. One or the other of these factors may be controlling in any given situation. One way to speed the mass transfer, in either case, is to reduce the size of the adsorbent particles.

While the synthetic crystals of zeolites are relatively small, e.g., 0.1 μm to 10 μm, these smaller particles may be bonded or agglomerated into larger shapes. Typical commercial spherical particles have an average bonded particle size of 1000 μm to 5000 μm (4 to 12 mesh). Other molecular sieve shapes, such as pellets (1-3 mm diameter), Rashig rings, saddles, etc., are useful.

The molecular sieve should be employed as received from the manufacture which is in the most dry conditions. If the molecular sieve has been exposed to the atmosphere, it is preferred that it be reactivated according to manufacturer's recommendations.

Following the insertion of the first packet 20 into base 14 of container 12, the photographic motion picture film reel is inserted and then the second envelope or packet 20 containing the molecular sieve is disposed on the other surface of the film reel. The lid 16 is next positioned on the base 14 to create a hermetic seal. If the container 12 is not particularly adapted to forms such as seal, the seam can be covered with a suitable tape material in order to bring about such seal. The storage assembly is now complete.

The invention will be further illustrated by the following examples.

EXAMPLE I

An Eastman Color High Speed Negative Film 5294 having an approximate length of 20,000 feet is processed Dmin by the standard ECN-2 process.

This roll is cut into 100 feet roll lengths and divided into five groups. The 100 feet rolls are preconditioned by festooning for three days at 21oC. in 30%, 40%, 50%, 60% and 70% RH condition rooms.

A total of 300 step wedges of 5294 negative film are separately processed by the ECN-2 process to provide neutral (N), cyan (C), magenta (M) and yellow (Y) density patches and the original densities are measured using Status M densitometry. These step wedges are separated into five groups and are conditioned at 21° C. and free hung in each of the respective relative humidities rooms as above.

Film-Can Preparation

The following operation is carried out in the respective relative humidity rooms maintained at 21° C. after preconditioning for three days. Each preconditioned 100-ft length of processed 5294 film is loosely wound by hand in roll form and placed inside 100-ft by 35 mm tin-coated cans. In addition, two strips of the preconditioned density step wedges, for duplicate measurements, are inserted into the convolutions of the roll film listed for each incubation condition. One set of this duplicate strip is inserted at the outer convolution of the 100-ft roll, and the other strip is inserted toward the core end of the roll. The can is almost filled by the film and the density strips. A total of ninety such cans for each humidity condition is used. Of 135 cans, 45 contain 5%, 45 contain 10% and 45 contain 15% by weight of Lindy Type 4A molecular sieve positioned in accordance with FIG. 1. A comparison with 15 cans without molecular sieves are made. Each can, containing the stated contents is closed with a lid and taped several laps with a moistureproof tape. These closed and taped cans are further placed inside heat-sealed polyethylene-lined aluminum-foil bags to maintain the moisture content within the cans and to prevent any possible contamination of the free-hung samples which are also kept in the same humidity rooms.

The following described samples are incubated in temperature controlled ovens maintained at 80, 70, 60, 50, 40 and 21° C. and at 30, 40, 50, 60 and 70% RH condition.

The cans are placed in the ovens at each temperature and humidity condition.

In addition, twelve separate strips of density step wedges are incubated in a free hanging position in the ovens maintained at 80, 70, 60, 50, 40 and 21° C. and at 40%, 50% and 60% RH conditions as a control (without molecular sieves).

A can of each type containing the film and duplicate step-wedge strips in the confined mode, along with duplicate step-wedge strips of the free hung mode are withdrawn over time intervals. Changes in chemical and physical properties along with densitometry are measured at each interval of time for a total of ten intervals of time at 80, 70 and 60° C. and at five intervals of time at 50, 40 and 21° C. spread over four years. The results are set forth in Table I.

The Arrhenius predicted estimations for 0.1 loss in yellow, magenta, and cyan density of 5294 films at 2 and 21° C., and at 30, 40, 50, 60 and 70% RH in the free-hung mode and in the confined modes in tin-coated and painted cans are shown in Table I.

The Arrhenius predicted estimations were made in accordance with the ANSI IT9.9-1990 standard, American National Standard for Imaging Media—Stability of Color Photographic Images—Methods for Measuring.

TABLE I

Arrhenius Predicted Estimations in Years for 5294 Film
(Composite Data Averaged Over All Relative Humidities Tested)
Response: Times for −0.1 Density Loss in Yellow, Magenta, and Cyan (1)

| Incubation Mode | Percent Relative Humidity Range | Predicted Estimations in Years for −0.1 Density Loss at Storage Temperatures of 2° C. and 21°C. (2) | | N Sum of Data Used |
|---|---|---|---|---|
| Yellow Density Patch | | | | |
| Free-hung samples | 40–60% | 1900 | 70 | 44 |
| Confined cans w/ zero grams of molecular sieves | 30–70% | 900 | 40 | 98 |
| Confined cans w/ 14 to 28 grams of molecular sieves | 30–70% | 41600 | 640 | 24 (3) |
| Magenta Density Patch | | | | |
| Free-hung samples | 40–60% | 8200 | 270 | 32 |
| Confined cans w/ zero grams of molecular sieves | 30–70% | 13,300 | 300 | 84 |
| Confined cans w/ 14 to 28 grams of molecular sieves | 30–70% | 15,000 | 390 | 16 (3) |
| Cyan Density Patch | | | | |
| Free-hung samples | 40–60% | 7400 | 310 | 20 |
| Confined cans w/ zero grams of molecular sieves | 30–70% | 19,400 | 390 | 72 |
| Confined cans w/ 14 to 28 grams of molecular sieves | 30–70% | 19,400 | 580 | 8 (3) |

Footnotes:
(1) The density loss of −0.1 in yellow, magenta, and cyan density patches used in this study should not be used as acceptability criteria, but are the numbers that can be reliably determined for Arrhenius estimations.
(2) The predicted estimations in years at 2° C. given in Table I are to be used as indicators for low temperature storage based on Arrhenius extrapolations. The data suggests that improvements in keeping is observed at both 2° and 21° C. storage temperatures in presence of molecular sieves.
(3) No significant change in density has occurred with cans containing molecular sieves to accurately predict the times for loss of 0.1 density, especially at the lower temperature incubations. Notice the value of N, the number of data points used in the Arrhenius plots is much lower than in the free hung and the confined can storage with zero molecular sieves. This work is being continued in the laboratory.

EXAMPLE 2

The procedure of Example I is repeated with the exception that 5 percent by weight of the molecular sieve is employed in place of that of Example I. Comparable results are observed especially for those films, preconditioned at lower relative humidities.

While the invention has been demonstrated above specifically for Eastman Color High Speed Negative Film 5294, it has been observed that the invention is applicable to all photographic films.

What is claimed is:

1. A method of improving the archival properties of a processed photographic element which comprises placing the processed element into a container substantially immediately after processing, disposing within said container at least 3 percent by weight, based on the weight of the photographic element of a molecular sieve and sealing the container.

2. The method claim 1 wherein the molecular sieve is enclosed in an air permeable, molecular sieve impermeable envelope.

3. The method of claim 1 wherein the weight of molecular sieve is from about 5 to about 20 percent by weight.

4. The method of claim 1 wherein the container is hermetically sealed.

5. The method claim 1 wherein the processed photographic element is wound upon itself in a continuous roll having a measurable outer diameter.

6. The method claim 5 wherein the molecular sieve is enclosed in an air permeable molecular sieve impermeable envelope.

7. The method claim 6 wherein the envelope is coextensive with the measurable outer diameter of the photographic element.

8. The method claim 1 wherein the container has an internal volume not greater than twice the volume occupied by the photographic element.

9. The method of claim 8 wherein the container has an internal volume not greater than 1.5 times the volume occupied by the photographic element.

10. A storage assembly for processed photographic elements comprising a sealed container surrounding a photographic element and a quantity of at least 3 percent by weight of a molecular sieve based on the weight of the photographic element.

11. The storage assembly of claim 10 wherein the molecular sieve is present in an amount of from about 5 to 20 percent by weight based on the weight of the photographic element.

12. The storage assembly of claim 10 wherein the container is hermetically sealed.

13. The storage assembly of claim 10 wherein the molecular sieve is enclosed in an air permeable, molecular sieve impermeable envelope.

14. The storage assembly of claim 13 wherein the photographic element is wound upon itself in a continuous roll having a measurable outer diameter.

15. The storage assembly of claim 14 wherein the envelope is coextensive with the measurable outer diameter of the photographic element.

16. The storage assembly of claim 10 wherein the container has an internal volume not greater than twice the volume occupied by the photographic element.

17. The storage assembly of claim 16 wherein the container has an internal volume not greater than 1.5 times the volume occupied by the photographic element.

18. The storage assembly of claim 10 wherein the photographic element is in the form of a reel of motion picture film.

19. The storage assembly of claim 18 wherein the container is stainless steel.

* * * * *